US009501356B2

(12) United States Patent
Palmer et al.

(10) Patent No.: US 9,501,356 B2
(45) Date of Patent: Nov. 22, 2016

(54) FAST DATA BACK-UP AND RESTORE BETWEEN VOLATILE AND FLASH MEMORY

(71) Applicant: International Business Machines Corporation, Armonk, NY (US)

(72) Inventors: Michael J. Palmer, Southampton (GB); Kelvin Wong, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 175 days.

(21) Appl. No.: 14/460,512

(22) Filed: Aug. 15, 2014

(65) Prior Publication Data

US 2015/0052393 A1 Feb. 19, 2015

(30) Foreign Application Priority Data

Aug. 19, 2013 (GB) .................................. 1314810.1

(51) Int. Cl.
*G06F 11/00* (2006.01)
*G06F 11/10* (2006.01)
*G06F 12/02* (2006.01)

(52) U.S. Cl.
CPC ....... *G06F 11/1076* (2013.01); *G06F 12/0246* (2013.01); *G06F 2212/7208* (2013.01)

(58) Field of Classification Search
CPC ............. G06F 11/1076; G06F 11/108; G06F 12/0246; G06F 2212/7204; G06F 2212/7207; G06F 2212/7208
See application file for complete search history.

(56) References Cited

U.S. PATENT DOCUMENTS 5,802,551 A 9/1998 Komatsu et al.
7,856,528 B1 12/2010 Frost et al.
8,103,821 B2 1/2012 Chang et al.
8,112,573 B2 2/2012 Keays
8,169,839 B2 5/2012 Moshayedi et al.

(Continued)

FOREIGN PATENT DOCUMENTS

EP 2249243 A1 11/2010
EP 2299363 A1 3/2011

(Continued)

OTHER PUBLICATIONS

Boukhobza et al., "A Cache Management Strategy to Replace Wear Leveling Techniques for Embedded Flash Memory," SPECTS 2011, p. 1-8.

(Continued)

*Primary Examiner* — Joseph Kudirka
(74) *Attorney, Agent, or Firm* — James H. Mayfield

(57) ABSTRACT

Back-up of data to flash memory. Data to back up is written into stripes, which are sets of pages across flash memory backup devices having the same block and page address. First metadata is embedded in each stripe indicating any blocks of the flash memory known to be bad. In response to encountering a new error in a block of flash memory during writing data to back up to a stripe, re-writing the stripe starting at the next available stripe excluding pages on the block of flash memory having the new error, writing subsequent stripes excluding pages on the block of flash memory having the new error, and embedding second metadata in the re-written and subsequent stripes indicating the location of the block having the new error. Responsive to finding no bad blocks indicated in the first metadata, initiating a write to two or more stripes simultaneously.

20 Claims, 15 Drawing Sheets

(56) References Cited

U.S. PATENT DOCUMENTS

| | | | |
|---|---|---|---|
| 8,200,885 | B2 | 6/2012 | Sartore |
| 8,200,929 | B1 | 6/2012 | Sartore |
| 8,566,639 | B2 | 10/2013 | Moshayedi et al. |
| 8,819,337 | B1 | 8/2014 | Oshinsky et al. |
| 9,053,012 | B1 * | 6/2015 | Northcott ............ G06F 12/0246 |
| 2006/0015683 | A1 | 1/2006 | Ashmore et al. |
| 2006/0239075 | A1 | 10/2006 | Williams et al. |
| 2008/0256420 | A1 | 10/2008 | Hafner et al. |
| 2009/0172335 | A1 * | 7/2009 | Kulkarni ................. G06F 3/061 |
| | | | 711/170 |
| 2009/0240873 | A1 | 9/2009 | Yu et al. |
| 2010/0122148 | A1 | 5/2010 | Flynn et al. |
| 2010/0202239 | A1 | 8/2010 | Moshayedi et al. |
| 2010/0318844 | A1 | 12/2010 | Matsuda et al. |
| 2011/0093650 | A1 | 4/2011 | Kwon et al. |
| 2011/0302445 | A1 | 12/2011 | Byom et al. |
| 2012/0023365 | A1 | 1/2012 | Byom et al. |
| 2012/0151254 | A1 | 6/2012 | Horn |
| 2012/0159289 | A1 | 6/2012 | Piccirillo et al. |
| 2012/0185738 | A1 * | 7/2012 | Gyllenskog ......... G06F 11/1044 |
| | | | 714/54 |
| 2012/0236656 | A1 | 9/2012 | Cometti |
| 2012/0239976 | A1 | 9/2012 | Cometti et al. |
| 2013/0173954 | A1 | 7/2013 | Woo et al. |
| 2014/0281174 | A1 | 9/2014 | Lee |

FOREIGN PATENT DOCUMENTS

| | | |
|---|---|---|
| GB | 2507961 A | 5/2014 |
| TW | 201428757 A | 7/2014 |
| WO | 2012100087 A2 | 7/2012 |
| WO | 2014075823 A1 | 5/2014 |
| WO | 2014120140 A1 | 8/2014 |

OTHER PUBLICATIONS

Micron, "Wear-Leveling Techniques in NAND Flash Devices The Importance of Wear Leveling," TN-29-42, 2008, p. 1-8, Micron Technology, Inc.

Palmer et al, "Fast Data Back-Up and Restore Between Volatile and Flash Memory," Filed on Aug. 19, 2013, p. 1-52, GB Patent Application No. 1314810.1.

UK Intellectual Property Office, "Examination Report under Section 17(5)," Jan. 27, 2014, International Application No. GB 1314810.1.

Yun et al., "Bloom Filter-based Dynamic Wear Leveling for Phase-Change RAM," DATE12, 2012, EDAA.

Borland, Jes Schultz, "Improving the Performance of Backups", Brent Ozar Unlimited®, © 2015, Jan. 21, 2014, <http://www.brentozar.com/archieve/2014/01/improving-the-performance-of-backups/>, pp. 1-7.

Chang et al., "Efficient Wear Leveling in NAND Flash Memory", Inside Solid State Drives (SSDs), Springer Series in Advanced Microelectronics 37, Chapter 9, pp. 233-257, DOI 10.1007/978-94-007-5146-0 9, © Springer ScienceCBusiness Media Dordrecht 2013.

"Back-Up and Restoration of Data Between Volatile and Flash Memory", UK Patent Application No. 1220442.6, filed on Nov. 14, 2012, pp. 1-29.

"Patent Act 1977: Search Report under Sectio 17(5)", Intellectual Property Office, Application No. GB1220442.6, dated Apr. 16, 2013, pp. 1-4.

Patent Cooperation Treaty, PCT, Notification of Transmittal of the International Search Report and the Written Opinion of the International Searching Authority, or the Declaration, Applicant's File Reference GB120132, International application No. PCT/EP2013/065898, Oct. 14, 2013, pp. 1-10.

"TN-29-42: Wear-Leveling Techniques in NAND Flash Devices", Micron®, pp. 1-8, © 2008 Micron Technology, Inc.

Palmer et al., "Back-Up and Restoration of Data Between Volatile and Flash Memory", U.S. Appl. No. 14/822,140, filed Aug. 10, 2015, 51 pages.

Palmer et al., "Back-Up and Restoration of Data Between Volatile and Flash Memory", U.S. Appl. No. 14/439,673, filed Apr. 30, 2015, 53 pages.

IBM Appendix P, list of patents and patent applications treated as related, Apr. 25, 2016, 2 pages.

* cited by examiner

FAST DATA BACK-UP AND RESTORE BETWEEN VOLATILE AND FLASH MEMORY

BACKGROUND

The present invention relates to the field of data back-up and restoration. In particular, the invention relates to fast back-up and restoration of data between volatile and flash memory.

When a main power fail is detected in a system, a pre-charged standby capacitor acts as a temporary power supply so that a controller device can copy data from volatile memory (for example, DRAM) into flash memory, thereby preserving it. On the resumption of main power, the backed up data can then be read from flash memory and restored back into the volatile memory.

There are several solutions which attempt to deal with, in one way or another, the main failure of flash technology, namely the wearing out of flash blocks after a certain number of erasures and programs. They deal with this failure by using wear-leveling algorithms to determine which blocks have had the least number of erasures/program cycles, thereby determining which blocks most likely can be written successfully. Wearing out of blocks is of particular concern in NAND flash technology, although this may also be of concern in NOR flash technology.

The drawback with these solutions is that despite using wear-leveling algorithms, flash page program errors may still occur during back-up. Once the back-up mechanism has begun, i.e., once the system is dependent upon the standby capacitor for power, and if a page program unexpectedly fails within a block, these solutions must spend valuable time erasing a fresh block to replace this previously unknown corrupt block. Otherwise, there may not be enough good blocks to back up all the desired data. The capacitor can only keep the system alive for a limited time. Block erases take significant time which could have been spent actually backing up the data. In addition, these solutions do not provide for the scenario where one or more (but not all) of the available flash devices fail completely. This is one reason why a faster and more adaptive back-up method is needed.

Therefore, there is a need in the art to address the aforementioned problems.

SUMMARY

The described aspects of the invention provide the advantage of identifying and reporting the locations of newly discovered bad blocks, so that metadata can be interrogated to determine the locations of both grown bad blocks and newly discovered bad blocks encountered during the back up operation, and from that information to improve the speed of the operation by using simultaneous writes to more than one plane.

Due to the adaptive nature of the save algorithm used by the described method, the save can still continue even if multiple flash devices (but not all) fail during the save which is also a significant advantage.

Other known solutions to the problem attempt to erase blocks on-the-fly upon encountering a known bad block so that they have enough storage to complete the save. There is limited time upon detecting power loss to perform a save before power completely is gone and a significant amount of time is wasted if a solution has to spend it erasing blocks. The described method does not have this issue, and, moreover, because writes are performed to a plurality of planes simultaneously, a significant amount of time can be saved.

Embodiments of the present invention provide a system, method, and program product to back-up of data to flash memory. Data to back up is written into stripes excluding pages on blocks of the flash memory known to be bad. A stripe is a set of pages across all available flash memory backup devices, each device including at least multiple blocks that include multiple pages, the set of pages in a stripe having the same block and page address. First metadata is embedded in each stripe indicating any blocks of the flash memory known to be bad. In response to encountering a new error in a block of flash memory during writing data to back up to a stripe, re-writing the stripe starting at the next available stripe excluding pages on the block of flash memory having the new error, writing subsequent stripes excluding pages on the block of flash memory having the new error, and embedding second metadata in the re-written and subsequent stripes indicating the location of the block having the new error. Responsive to finding no bad blocks indicated in the first metadata, initiating a write to two or more stripes simultaneously.

BRIEF DESCRIPTION OF THE SEVERAL VIEWS OF THE DRAWINGS

The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1:
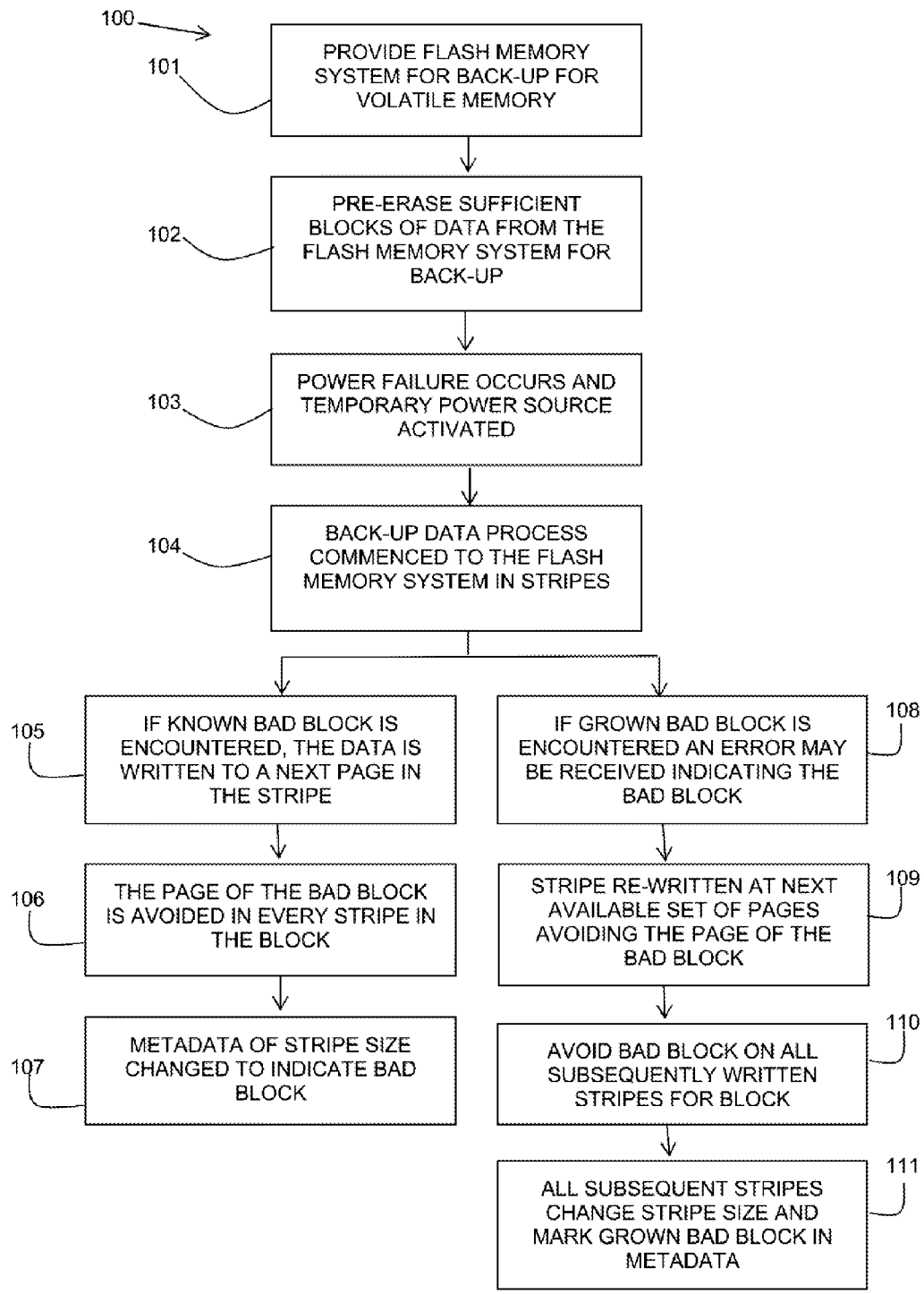
FIG. 1 is a flow diagram of an example embodiment of an aspect of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are provided for rapidly backing up data from a volatile memory source (e.g., DRAM) to non-volatile flash memory and restoring it back to volatile memory. The described method and system may be applied to both NAND and NOR flash memory, in particular where wear-out is of concern.

The described method saves data to flash memory just prior to a system power loss and allows it to be restored once power returns. The method is adaptive because it can deal in a selective manner with defects within the flash memory that were unknown to exist prior to starting the save. Defects may prevent data being saved to certain blocks due to excessive wear. These previously unknown defective blocks are referred to as "grown bad blocks" and cannot be detected until an attempt to write to them is made. Upon detecting a grown bad block, the method uses features to ensure that the data can still be successfully saved and later restored. Further, by enabling the system to detect grown bad blocks, the system can adaptively determine whether or not interleaved commands can be used to improve the speed of operation of the write command.

The concept of interleaved commands, such as page program commands, will need to be introduced here. Briefly stated, current flash memory devices consist of multiple dies which in turn consist of two planes; each plane is capable of accepting its own command (e.g., block erase, read or page program). If interleaved page program commands are issued to a pair of planes in the same die, the write performance improves by almost a factor of two over issuing individual program commands to each plane. Interleaved page program commands thus allow two planes on the same die to be programmed simultaneously.

In an embodiment, the present invention combines the detection and dynamic mapping of defective blocks with a determination as to which pairs of planes can have interleaved commands applied to them.

The detection and dynamic mapping aspect of the method uses the concept of organizing backed-up data into stripes. A stripe is a set of pages across all available flash devices, dies and planes which have the same block and page address. If the method comes across a grown bad block whilst saving a stripe of data it will re-write that stripe at the next available page address avoiding the defective block.

The method also embeds metadata along with the backed-up data. This metadata consists of bitmaps indicating the locations of previously known bad blocks and newly discovered grown bad blocks. The metadata also consists of a stripe number starting at 0 for the first stripe and incrementing with every stripe and a length field indicating the amount of data saved. The metadata is written into every page of a stripe. At the end of the saved data image, the method writes an end marker which is a stripe whose length field is zero. The method can then use the metadata to successfully re-construct the data during a restore according to the description given below.

Referring to FIG. 1, a flow diagram 100 shows an example embodiment of the aspect of back-up of data of the described method.

A non-volatile memory system, for example, in the form of a NAND or NOR flash memory system is provided 101 for back-up for volatile memory. Sufficient blocks of data may be pre-erased 102 (before the back-up mechanism is enabled) from the flash memory system to hold the amount of data to be backed-up. A number of spare blocks may also be pre-erased.

A set of registers hold the starting location of where to write the back-up data to flash memory, the starting location of where to start reading from in source memory as well as the amount of data to back up. These registers may be initialized before the back-up operation by the user.

A power failure may occur 103 and a temporary power source may be activated such as a charged capacitor during which a back-up process may be carried out.

A back-up process may commence 104 by backing up data to blocks of the NAND flash memory system in stripes as described in detail below.

During the back-up process, two scenarios may be encountered. Firstly, there may be known bad blocks which cannot be written to. Secondly, there may be newly encountered (grown bad) corrupted blocks which cannot be written to of which there is no information prior to the back-up process.

If a known bad block is encountered, the data is written to the next page 105 in the stripe. The page of the bad block may be avoided 106 in every subsequent stripe of the block. Metadata regarding the stripe size is changed 107 to indicate the shorter size due to the bad block.

If a grown bad block is encountered 108 which was not known about previously, an error may be received indicating the bad block. The stripe may be re-written 109 at a next available set of pages avoiding the page of the bad block. The page of the bad block may be avoided 110 for all subsequently written stripes for the block.

The re-written stripe and all subsequent stripes may change 111 the stripe size in their metadata to indicate the bad block and may also mark the grown bad block in a bitmap in the metadata.

Figure 8:
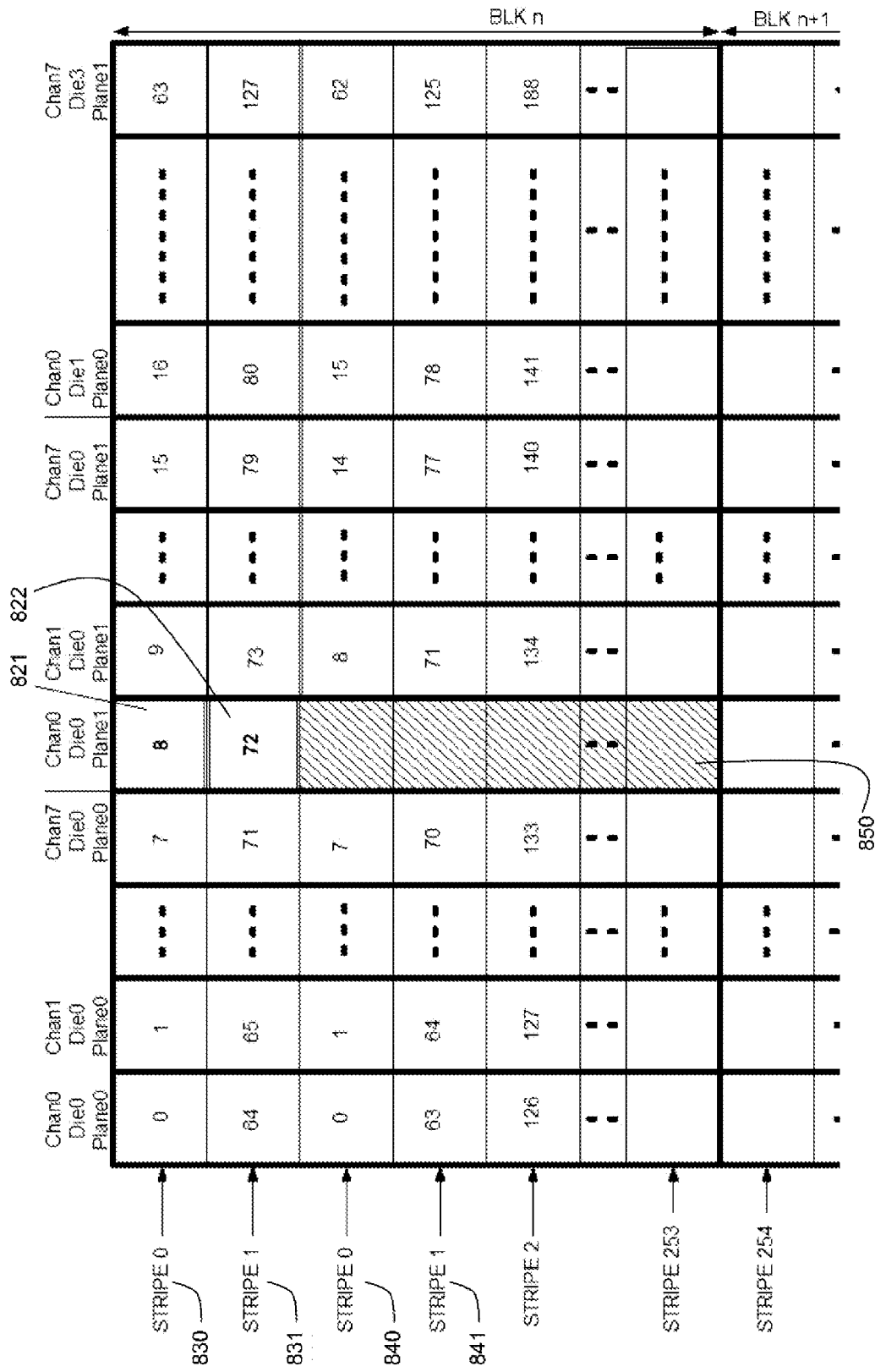
FIG. 8 is a schematic diagram of an example embodiment of a back-up with grown bad blocks in accordance with an aspect of the present invention.

As discussed further in relation to FIG. 8, more than one stripe may be backed-up simultaneously and the method may be adapted to accommodate this.

As the back-up proceeds the method embeds metadata, about newly encountered corrupt blocks, along with the data to be saved within the flash back up image. Providing sufficient spare blocks have been pre-erased, the method will continue backing up the data despite encountering unexpected flash page programming errors and without having to spend "capacitor" time erasing new blocks as a result. The dump will continue even if the failure of a whole flash device is experienced. The method will even tolerate the failure of multiple devices provided at least one remains usable.

Figure 2:
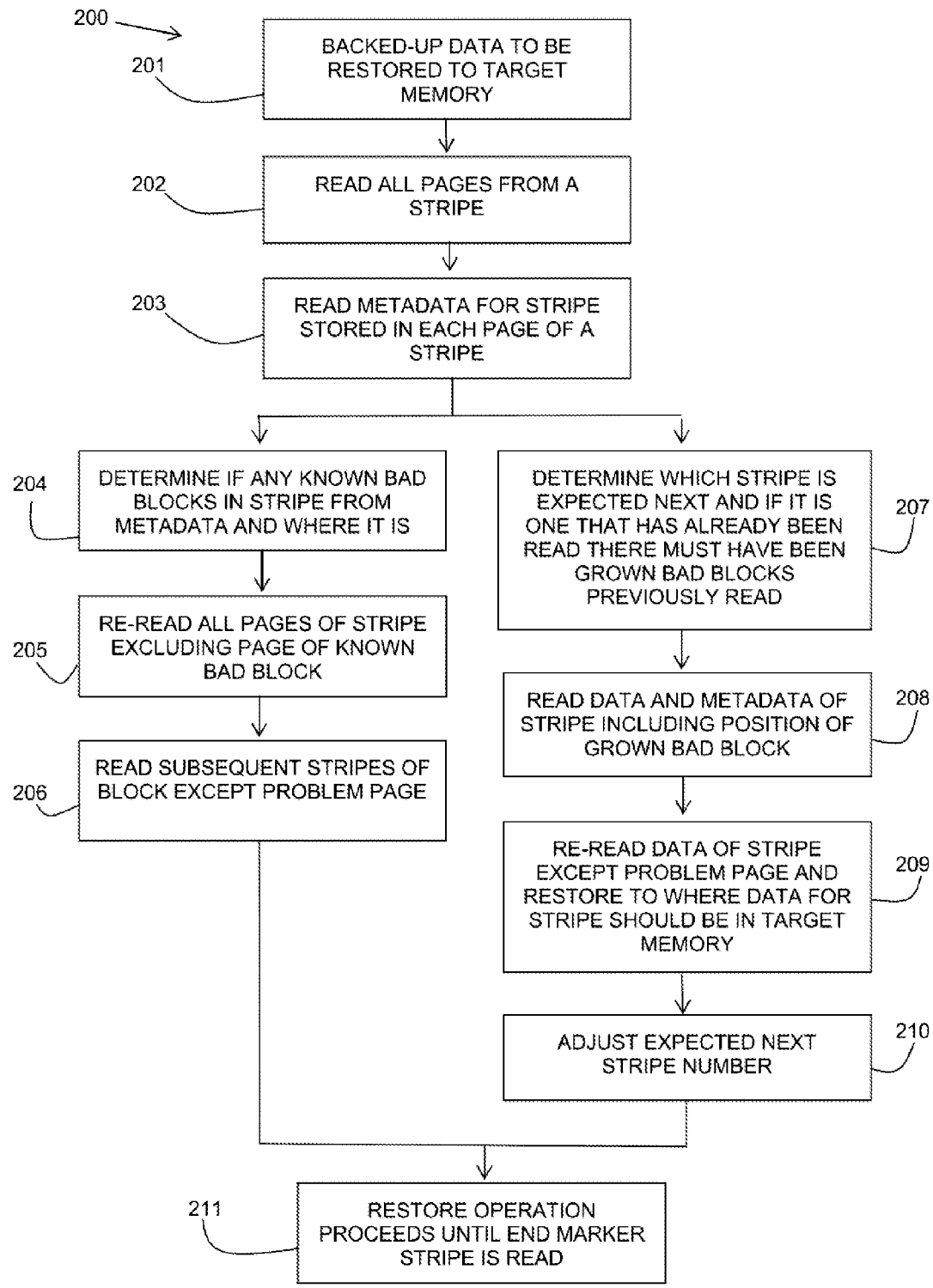
FIG. 2 is a flow diagram of an example embodiment of an aspect of a method in accordance with the present invention.

Referring to FIG. 2, a flow diagram 200 shows an example embodiment of the aspect of restoration of data of the described method.

When the backed up data is to be restored 201 to a target memory, a read 202 is carried out of the backed-up data of a stripe. The metadata for a stripe is read 203 as stored in each page of the stripe.

The metadata is used to determine the locations of any known bad blocks and/or any new corrupted blocks or whether an entire device failed. From this, the method can determine how to correctly restore the data despite these set backs. In this way, the method adapts to errors encountered during a back-up.

The two scenarios of restoration of a stripe with known bad blocks and grown bad blocks are further described in FIG. 2.

To accommodate known bad blocks, it may be determined 204 if any known bad blocks are in a stripe from the metadata and, if so, where it is. If there is a known bad block, all the pages of a stripe may be re-read excluding the page of the known bad block. All subsequent stripes in the block may be read 206 while excluding the problem page.

To accommodate grown bad blocks, it may be determined 207 which stripe number is expected next from the metadata and, if the stripe number is one that has already been read, this indicates that there must have been grown bad blocks in the previously read stripe's data.

The data and the metadata of the stripe are read 208 including the position of a grown bad block. The data of the stripe is then re-read excluding the problem page in the stripe and the data of the stripe is restored to where the data for the stripe number should be in the target memory. The next expected stripe number is adjusted 210.

In all cases, the restore operation proceeds 211 until an end marker stripe is read.

Figure 3:
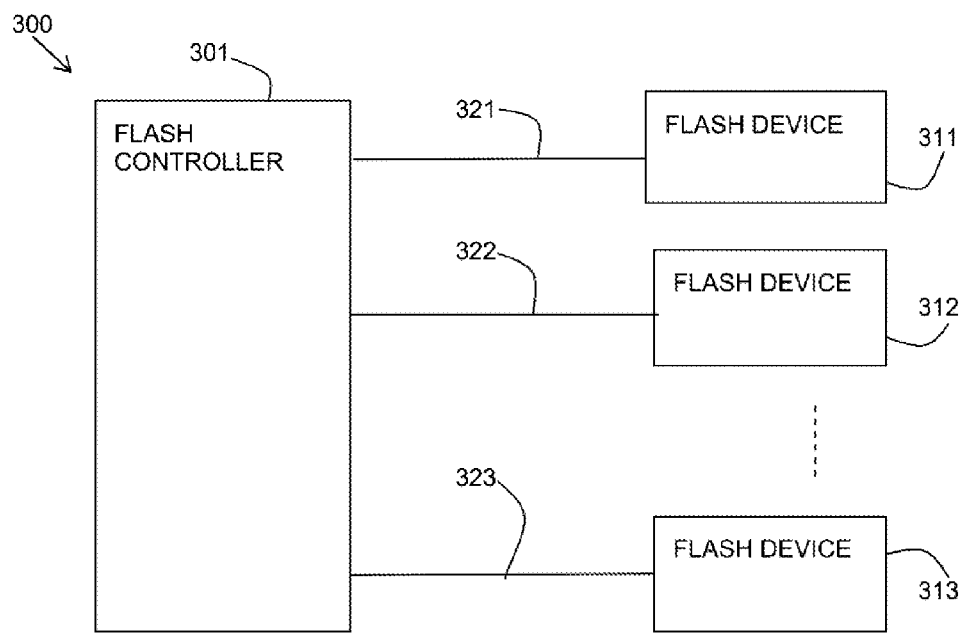
FIG. 3 is block diagram of an example embodiment of a flash memory system in accordance with the present invention.

Flash devices are divided into dies and each die has two planes. Each plane consists of a certain number of blocks (usually multiples of 1 K) and each block has a certain number of pages (usually multiples of 128). Each page holds a given payload of data. It is also possible to control multiple flash devices simultaneously through separate interfaces as shown in FIG. 3. In this description, each distinct flash device is known as a channel.

Referring to FIG. 3, a flash memory system 300 is shown having a flash controller 301 for controlling multiple flash devices 311-313. Each flash device 311-313 has a flash interface 321-323 with the flash controller 301. In this description, each distinct flash device 311-313 is referred to as a channel.

The described method uses a concept of a "stripe", which consists of all the pages in every available plane and in every available channel that have the same page address and block address.

Figure 4:
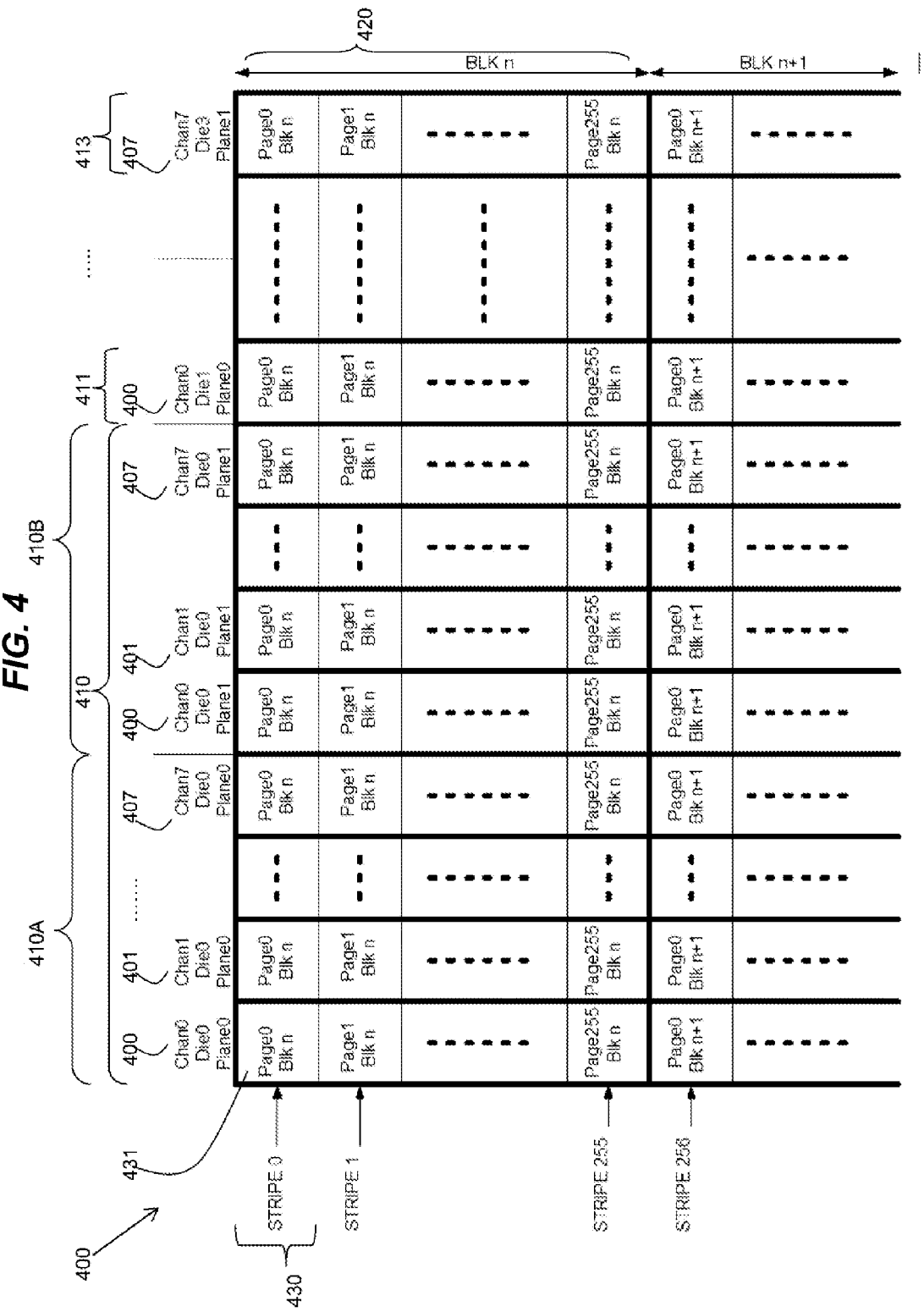
FIG. 4 is a schematic diagram an example embodiment of a flash memory system in accordance with an aspect of the present invention.

Referring to FIG. 4, a schematic diagram 400 shows an example embodiment of several stripes that reside at various page and block addresses in a flash memory system.

In this example embodiment, there are eight active channels 400-407 (numbered 0 to 7) with each channel containing four dies 410-413 (numbered 0 to 3). Given that there are two planes 410A, 410B per die, a single stripe consists of 64 pages. In addition, each block 420 on a plane consists of 256 pages. Thus across all channels, dies and planes, there can be 256 stripes 430 (0 to 255) per logical block address (LBA).

Each stripe 430 is a set of pages 431 across all available flash devices which has the same block and page address across all the channels, dies and planes.

Figure 5A:
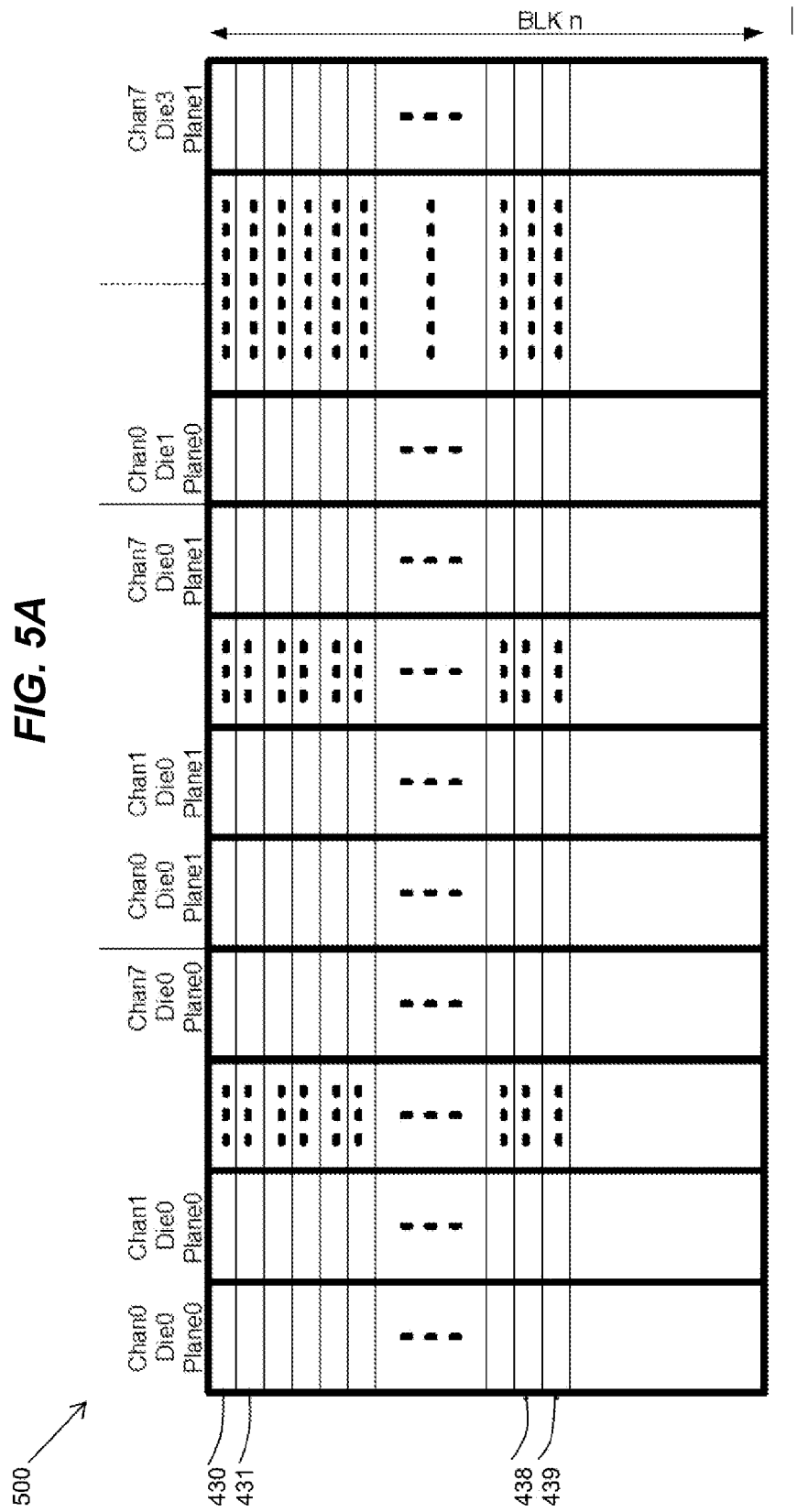
FIGS. 5A and 5B are schematic diagrams of example embodiments showing stripes of data in accordance with an aspect of the present invention.

Referring to FIG. 5A, a schematic diagram 500 shows a back-up process using the example embodiment of FIG. 4. It is assumed that the data to be backed up to flash memory (the source data) exists in a contiguous memory space within the system.

Back-up begins by copying enough source data to fill 64 flash pages in Stripe 0 430, then doing the same for Stripe 1, 431 and so on until all the required data has been backed up. A last Stripe X 438 is shown (for page x, block n).

When this occurs, an end marker stripe 439 (whose format is described later) is written at the next available page address (at page x+1, block n).

When power is restored, the saved data in flash memory can be copied back into a target location in system memory. This data restore begins by reading the flash data from Stripe 0 and writing it to this target location. The data from Stripe 1 is then read and copied to the next part of target space and so on. The restore operation finishes when the end marker is read.

In order to adapt to errors during the back-up process and in order to log the locations of flash blocks that have become bad or unusable, the described method writes a set of metadata into each page of each stripe (the remainder of a page may be filled up with source data). The metadata consists of the following:

Stripe number—beginning from 0 and usually increments with each stripe. However, newly discovered bad blocks can cause page program errors. When these are encountered, the method may have to back track a little and re-write stripes at a later location. Thus, it is possible for a flash image to contain two or mores stripes which have the same Stripe number. (Note that it is not possible to overwrite a piece of flash memory once it has been written without performing a complete erase of a block. A stripe re-write must therefore be done on a "fresh" piece of flash memory).

Stripe Size—This is the amount of backed up data contained within the stripe. The end marker is denoted by this field being zero.

Known Bad Pages Map—This is a bitmap which has one bit to represent every page in the stripe. If a bit is on, it indicates that the corresponding page in the stripe is known (before the back up operation begins) to belong to a bad block. Manufacturers provide a list for each flash device sold indicating the locations of each block known to be unusable within the device.

Grown Bad Pages Map—This is also a bitmap which has one bit to represent every page in the stripe. If a bit is on, it indicates that a particular page in the stripe belongs to a block that was discovered to be bad some time during the back up operation. This block was not included in the original bad block list provided by the flash manufacturer.

Figure 5B:
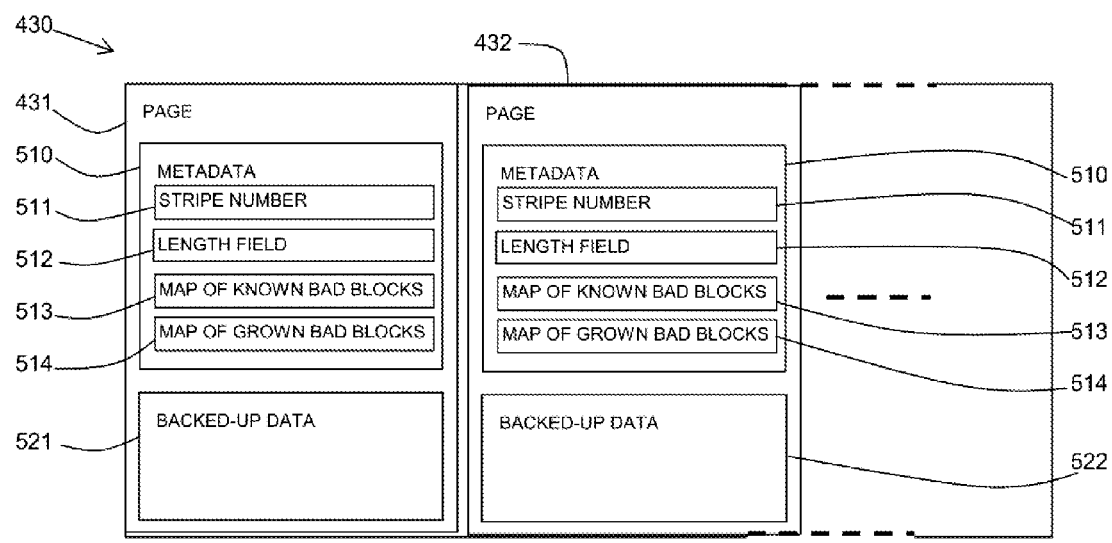

Referring to FIG. 5B, a schematic diagram shows the data stored in each of the pages of a stripe 430 across multiple channels of flash devices, i.e., each page with the same page and block address.

The first two pages 431, 432 are shown in the stripe 430. Each page 431, 432 in a stripe 430 includes a set of metadata 510 including a stripe number 511, a length field 512 for the amount of data saved in a stripe which may be changed if bad blocks are encountered or known about, a bitmap 513 of known bad blocks, and a bitmap 514 of grown bad blocks. The pages 431, 432 also includes the backed-up data 521, 522 with the backed-up data 522 of the second page 432 following on from the backed-up data 521 of the first page 431.

The size of the metadata stored in each page is typically very small compared to the available payload of a page. The exact size of the metadata depends on the exact configuration of flash memory used.

EXAMPLE METADATA

The largest stripe number is the product of the number of blocks and number of pages per block of the device used. In the described embodiment, 4 bytes may be sufficient to store this which results in an available 4 Giga-stripes. With 64 planes per stripe and 8 K pages that would result in 2 TBytes of data range, as an example.

For the map of known bad blocks and the map of grown bad blocks, one bit is required per plane in a stripe. In the embodiment described, which used 64 planes per stripe, each map would therefore be 8 bytes in size.

For the stripe size field, one could choose the number of pages as a unit measure. Thus in the embodiment, 7 bits (to represent decimal number 64) could be used; this could be rounded up to 1 byte.

Therefore, in this example, a total of 21 bytes may make up the metadata.

As an example, for an 8 K flash page which is a typical page size and has 8640 bytes of available payload, the metadata would represent less than 0.3% of the available payload. The remainder could be used to store backed-up data and error correction codes (ECC).

Figure 6:
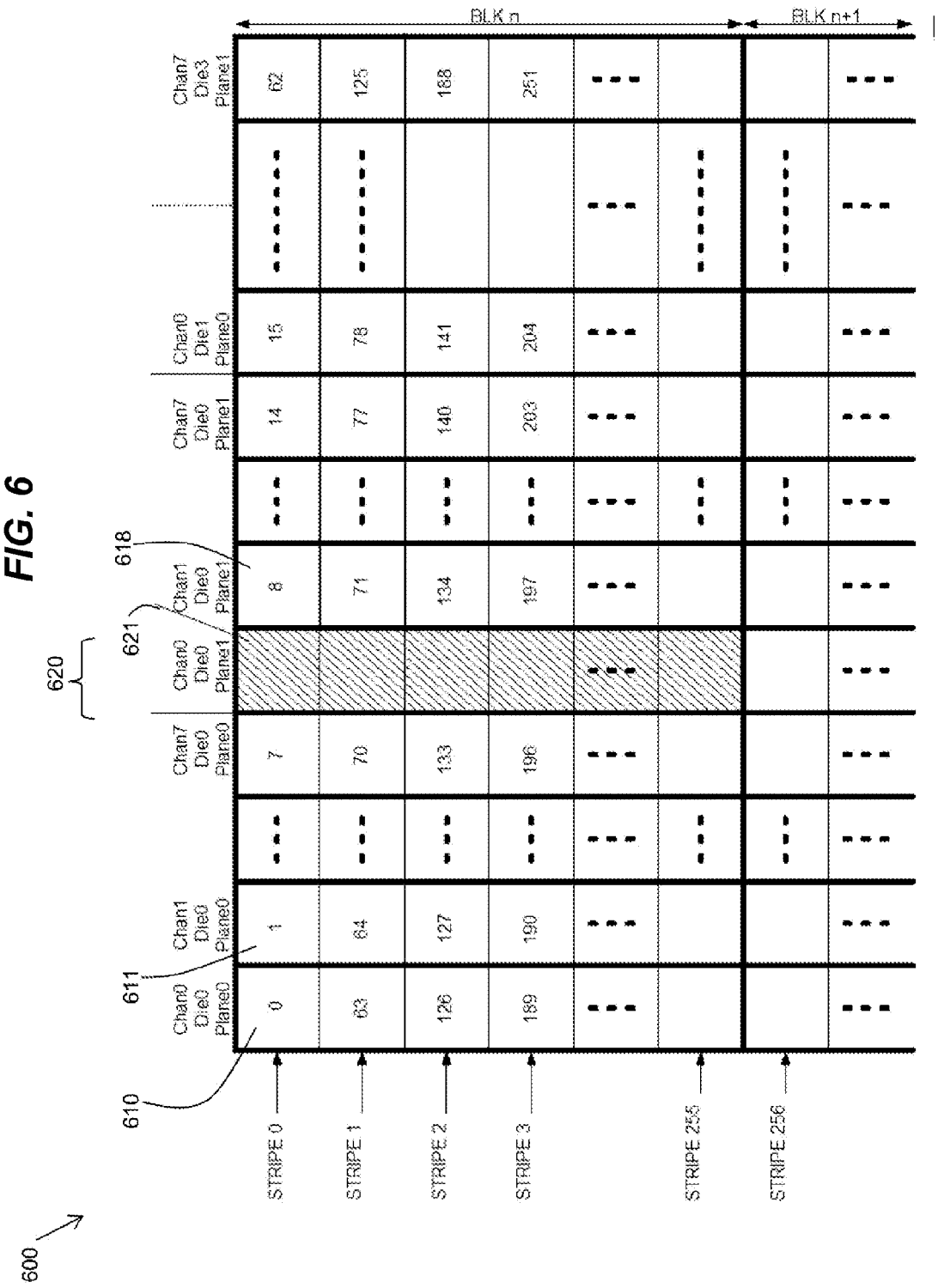
FIG. 6 is a schematic diagram of an example embodiment of a back-up with known bad blocks in accordance with an aspect of the present invention.

Referring to FIG. 6, a schematic diagram 600 illustrates an example embodiment of how the described method embeds the presence of known bad blocks within a flash image using the example of FIG. 4.

A page of source data 610, 611, is denoted by the ascending numbers 0, 1, etc., in each box of FIG. 6 (increasing horizontally across each stripe). The vendor's bad block list indicates that block n, of plane 1, on die 0, channel 0 is bad—represented by vertical line 620 of squares across the stripes. The described method uses this information to avoid every page 621 in the block for that particular plane.

In FIG. 6, it can be seen that page 8 of the source data (in Stripe 0) is not written to plane 1, die 0, channel 0. Instead it is written at the next available page 618 in the stripe (plane 1, die 0, channel 1). A similar thing happens with subsequent stripes within block n. The result is that each stripe holds 63 pages of data rather than the full capacity of 64. The "Stripe Size" metadata field for each stripe will reflect this. The known bad pages map metadata field in every other page in block n will indicate that block n for plane 1, die 0, channel 0 is bad.

When restoring the data shown in FIG. 6 from flash memory, the described method proceeds with no fore knowledge of bad planes. It will attempt to read every single available page in Stripe 0 including the page belonging to the known bad block and restore the data to a target space on the system. It may get an error when reading the page on the bad block but will be able to read the other 63 pages successfully.

Figure 7A:
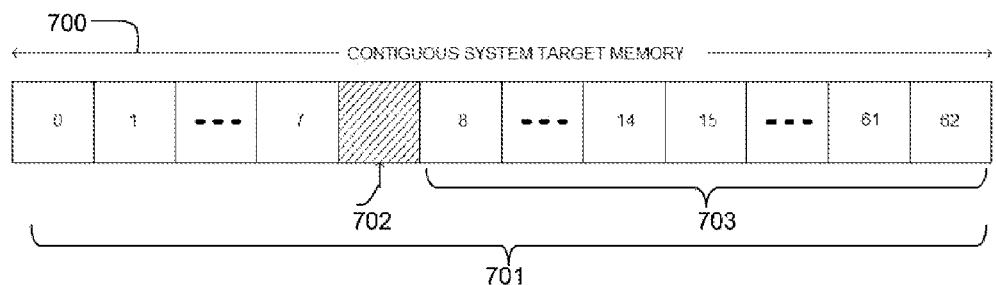
FIGS. 7A to 7C are schematic diagrams of an example embodiment of restoring backed-up data with known bad blocks in accordance with an aspect of the present invention.
Figure 7B:
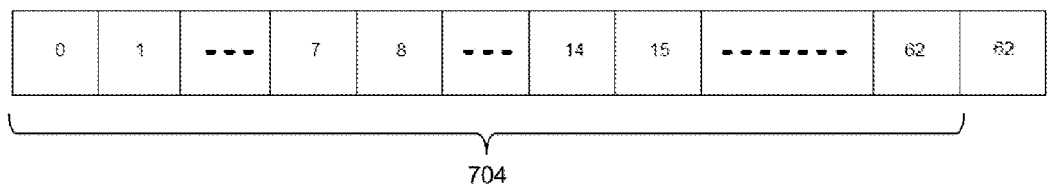
Figure 7C:
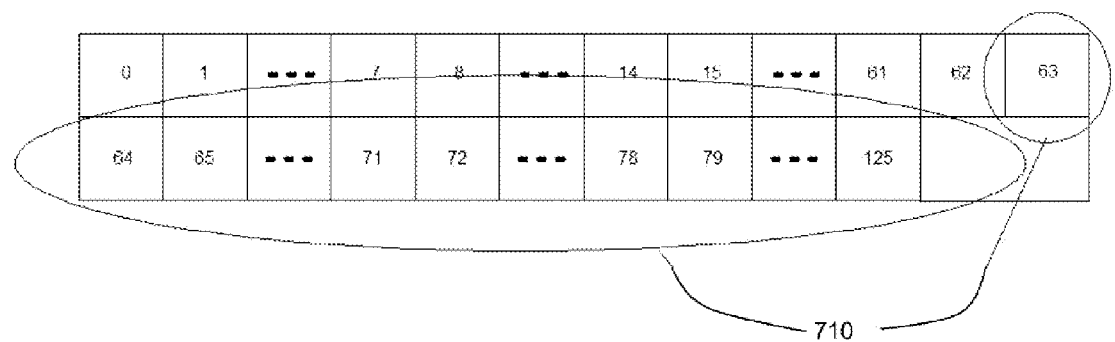

FIGS. 7A to 7C illustrates the example embodiment of FIG. 6 when restoring backed-up data when a known bad block was in a flash device.

Referring to FIG. 7A, a diagram shows the Stripe 0 701 as written back to contiguous system target memory 700 including the page 702 to which no data is copied due to failure reading a page from the known bad block at block n, channel 0, die 0, plane 1. It will also, as a consequence, initially write all the pages from page 8 onwards 703 of Stripe 0 to the wrong position in the target space.

Upon reading all the pages in the stripe, the described method then interrogates the known bad plane map metadata field and determines that there was one page belonging to a known bad block. From this, the described method can deduce that the page of plane 1, die 0, channel 1 actually contains page 8 of the back up data rather than page 9.

Referring to FIG. 7B, all pages of Stripe 0 701 are re-read 704 excluding the page 702 on the known bad block and the piece of target space is overwritten with the data now in the correct place.

In addition, now that the location of a bad block has been determined, the described method knows to avoid reading any pages from plane 1, die 0, channel 0 for the remainder of block n.

In FIG. 7C, the contents of Stripe 1 710 are copied to target space except for the page from this bad block.

Referring to FIG. 8, a schematic diagram 800 illustrates an example embodiment of how the described method embeds the presence of newly discovered (grown) bad blocks within a flash image again using the example of FIG. 4.

If the described method encounters an error whilst programming a flash page it assumes that that page belongs to a grown bad block. The example of FIG. 8 has the same flash configuration as that of FIG. 6; however, unlike the scenario of FIG. 6, it is not known before the back up operation is initiated that block n on plane 1, die 0, channel 0 is bad—represented by square 821.

In order to efficiently use the time provided by the pre-charged capacitor during a power-down, various embodiments of the described method may attempt to write multiple stripes at a time. In the embodiment discussed in this example, it is efficient for the described method to write two stripes at once. Thus Stripes 0 and 1 830, 831 can be started together. As soon as Stripe 0 830 has completed (and provided it completed with no errors), Stripe 2 can be started; when Stripe 1 831 has completed (with no errors), Stripe 3 can be started and so on. It is efficient to be writing two stripes at once because a single plane may typically handle two page program commands at once and thus collectively the flash devices are capable of writing two stripes at a time.

Flash page program commands are initiated to write Stripes 0 and 1 830, 831. For Stripe 0 830, the described method attempts to write pages 0-63 of the source data. This includes writing page 8 of the source data to page 821 address 0 of block n on plane 1, die 0, channel 0. For Stripe 1 831, the described method attempts to write pages 64-127. This includes writing page 72 of the source data to page 822 address 1 of block n on plane 1, die 0, channel 0. The stripe size metadata fields in both stripes indicate that they each have a capacity of 64 pages.

When writing to pages 0 821 and 1 822 of block n on plane 1, die 0, channel 0 the described method will receive errors. In response, the described method re-writes Stripe 0 830 (with stripe number metadata field set to 0) onto the next set of pages 840 (in this case all pages with page address 2 of block n) and, similarly, re-writes Stripe 1 831 (with stripe number metadata field set to 1) onto the set of pages after that 841.

Now that the described method knows that block n on plane 1, die 0, channel 0 is bad, it avoids writing to any pages on that plane 650 for the remainder of block n. The re-written versions of Stripes 0 and 1, as well as all subsequent stripes in block n will mark in the grown bad planes map metadata field that there was a bad block discovered at block n on plane 1, die 0, channel 0. The stripe size metadata fields will also indicate a capacity of 63 pages taking into account the presence of a new grown bad block.

Referring to FIGS. 9A to 9E, the schematic diagrams show an example embodiment of what happens when the described method attempts to restore the data saved in the example of FIG. 8 back to target memory.

Figure 9A:
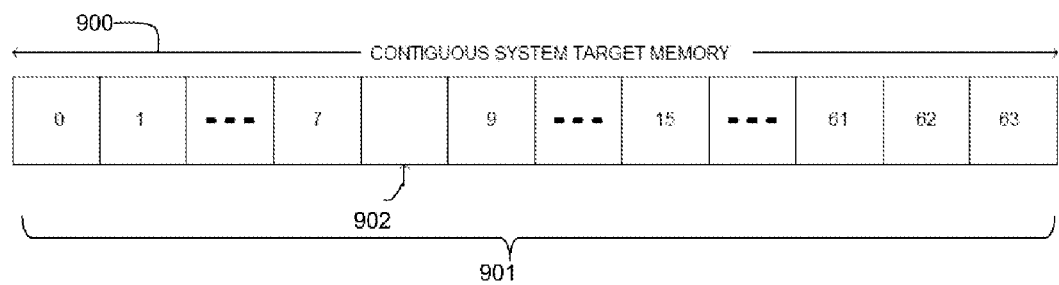
FIGS. 9A to 9E are schematic diagrams of an example embodiment of restoring backed-up data with grown bad blocks in accordance with an aspect of the present invention.

The described method keeps track of which stripe it is expecting to see next, beginning with Stripe 0. The described method will begin by reading all pages in block n with page address 0. It will attempt to restore the data from all 64 pages into the target area not realizing that a grown bad plane was discovered during the back-up. This is shown in FIG. 9A showing a stripe of data 901 written back to system memory 900 including the section 902 to which no data is copied due to failure reading a page from the grown bad block.

Figure 9B:
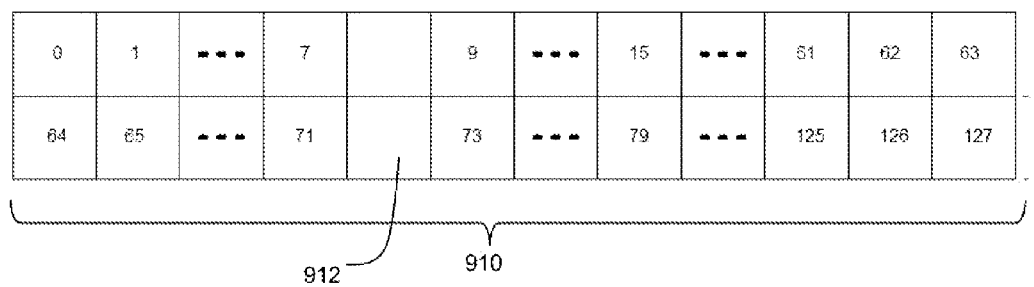

Referring to FIG. 9B, the described method is expecting this stripe 901 to be Stripe 0 and since the stripe number fields of the stripe indicate this is indeed Stripe 0, the described method carries on to reading the stripe at the next page address. The next stripe 910 the described method expects to see is Stripe 1. It reads all pages in block n with page address 1 and writes the data within this stripe 910 to the next part of the target area, again not realizing that a grown bad plane 912 was discovered. The stripe number metadata fields indicate Stripe 1 as expected and the described method proceeds to the next page address which is 2.

Figure 9C:
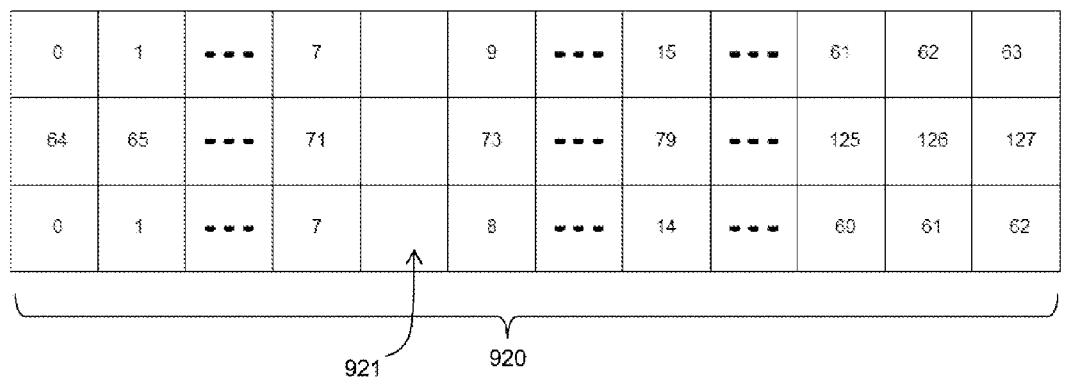

Referring to FIG. 9C, the described method reads the stripe 920 at page address 2 and expects this to be Stripe 2. It restores the data it reads to the next part of the target area after the data from Stripes 0 and 1. Once all the pages at page address 2 have been read, the described method can tell from the stripe number field, that this is a re-write of Stripe 0. It has also read the grown bad pages map from this stripe and determined that a grown bad plane 921 was discovered previously at plane 1, die 0, channel 0.

Figure 9D:
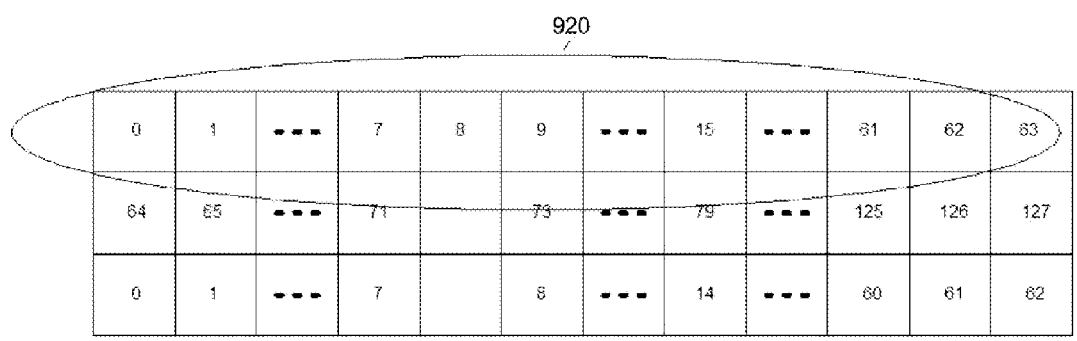

Referring to FIG. 9D, on seeing this, it re-reads every page in this stripe 920 with the exception of the page on the grown bad plane 921, and restores it to where the data for Stripe 0 should reside in target memory. The described method adjusts the stripe number it expects to see next to the value of Stripe 1 (having just re-read Stripe 0) and proceeds to read the stripe at the next page address of 3.

Figure 9E:
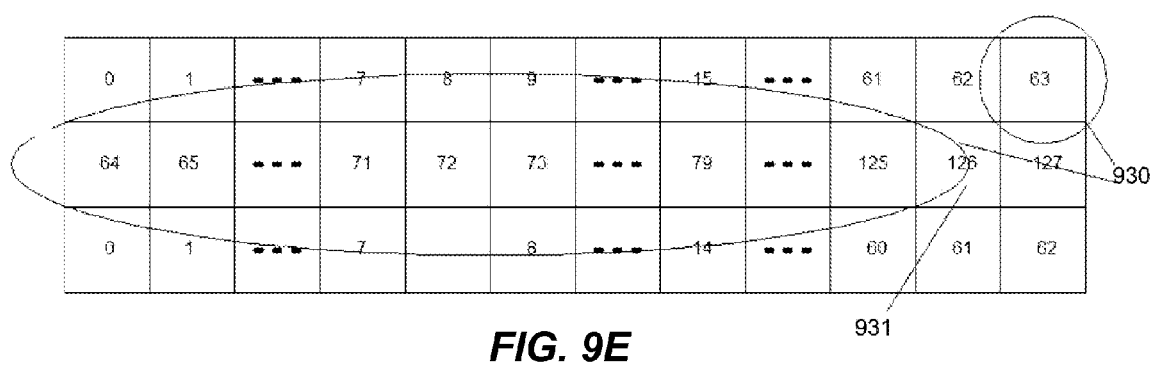

Referring to FIG. 9E, the stripe 930 at this page address is a re-write of Stripe 1, as indicated by the stripe number field, and this is the stripe number the described method is expecting. The data read from this stripe is copied into the target area just after the data from the re-write of Stripe 0 920. The data from page 126 (reference 931) of the target memory onwards may be overwritten with the correct data as read from the image saved on flash. The rest of the restore operation proceeds in a similar way until the end marker stripe is read from flash.

This described method has the advantage over known solutions to flash back up in that it can adapt to blocks that were discovered to be bad during the actual back up process. In addition, if an entire channel (i.e., flash device) were to fail the back up process could still continue. A complete channel failure would simply mean that all the pages belonging to that channel would be marked as bad in the grown bad pages map metadata fields of good pages in the back-up image. The described method would use the grown bad page maps to avoid reading from that channel in the same way that it avoided reading from a page in block n of a particular plane on a particular die on a particular channel.

After the restore is complete, the last page of each block in the back-up image could be read manually to determine where the grown bad planes in those blocks were. System firmware could then update its own bad block list so that these blocks can be avoided on future back-ups.

Figure 10:
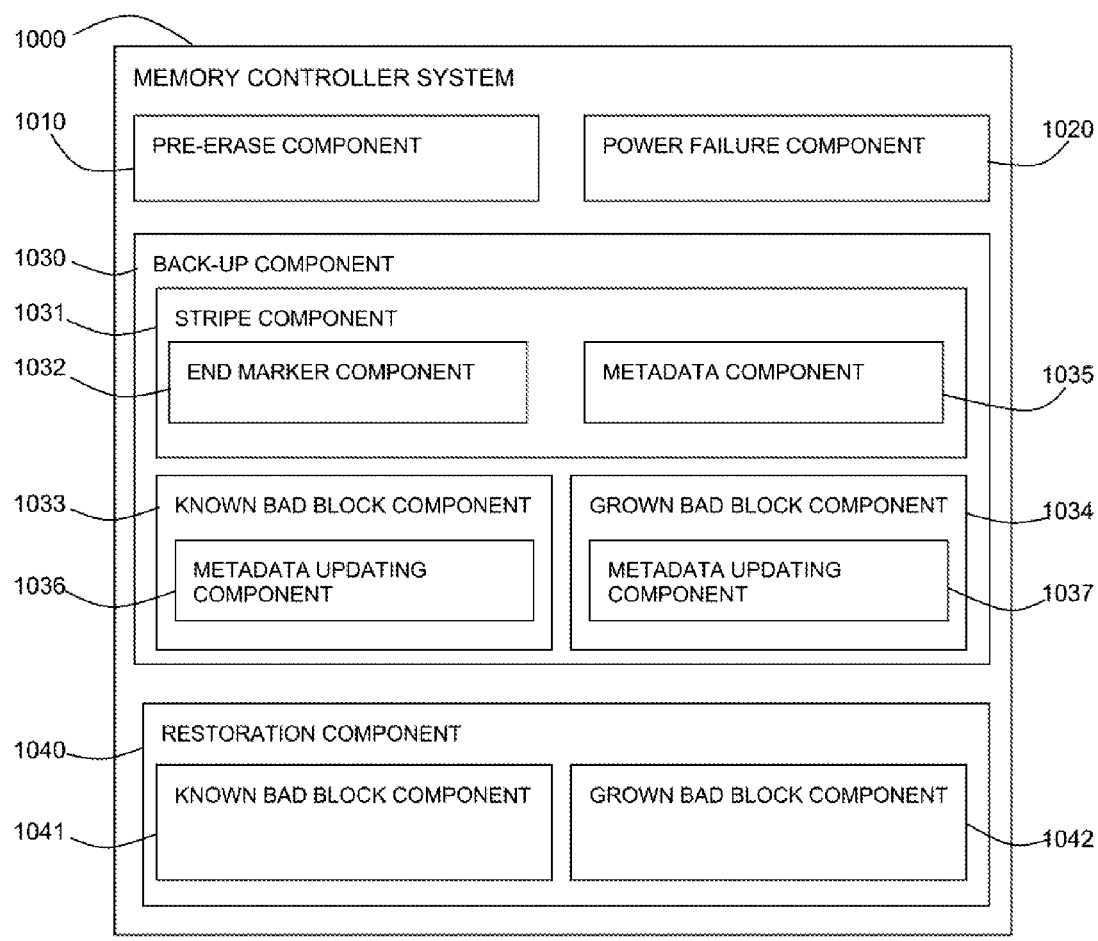
FIG. 10 is block diagram of an example embodiment of a flash memory controller system in accordance with a preferred embodiment of the present invention.

Referring to FIG. 10, a block diagram shows an example embodiment of a memory controller system 1000 for a flash memory system.

The memory controller system 1000 may include a pre-erase component 1010 for pre-erasing sufficient blocks from flash memory for the backed-up data. The memory controller system 1000 may include a power failure component 1020 for determining if a power failure has occurred. A back-up component 1030 may be provided for backing-up the data during a temporary period of power provided by a temporary power source such as a charged capacitor.

The back-up component 1030 may include a stripe component 1031 for backing-up data in stripes including an end marker component 1032 for inserting an end marker stripe to indicate the end of the backed-up data. The stripe component 1031 may also include a metadata component 1035 for including metadata for a stripe in each page of a stripe.

The back-up component 1030 may include a known bad block component 1033 for accommodating known bad blocks in the back-up process. The back-up component 1030 may also include a grown bad block component 1034 for accommodating grown bad blocks in the back-up process. The known bad block component 1033 and the grown bad block component 1034 may each contain a metadata updating component 1036, 1037 for updating the metadata in each page of a stripe if known bad blocks or grown bad blocks are encountered.

A restoration component 1040 may be provided including a known bad block component 1041 for accommodating known bad blocks in the restoration process and a grown bad block component 1042 for accommodating grown bad blocks in the restoration process.

Figure 11:
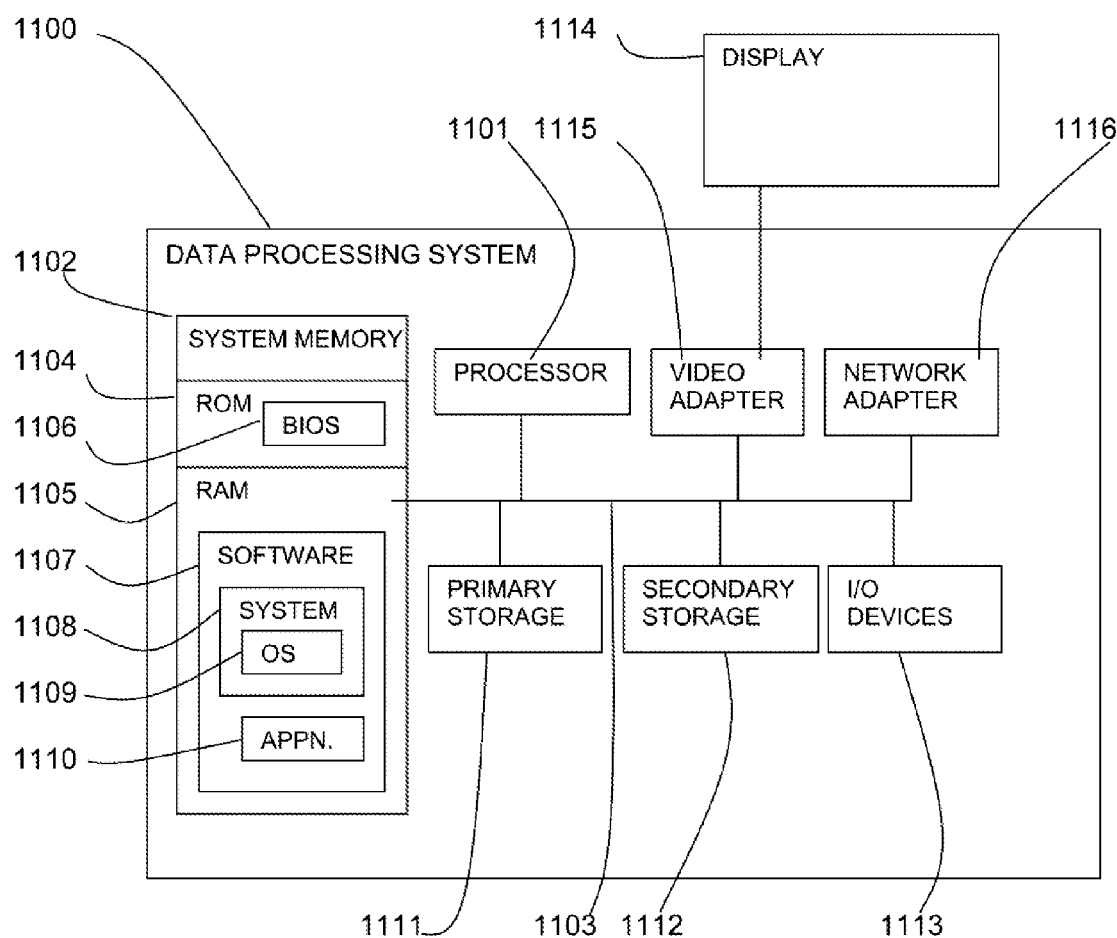
FIG. 11 is a block diagram of an embodiment of a computer system in which the present invention may be implemented.

Referring to FIG. 11, an exemplary system for implementing aspects of the invention includes a data processing system 1100 suitable for storing and/or executing program code including at least one processor 1101 coupled directly or indirectly to memory elements through a bus system 1103. The memory elements may include local memory employed during actual execution of the program code, bulk storage, and cache memories which provide temporary storage of at least some program code in order to reduce the number of times code must be retrieved from bulk storage during execution.

The memory elements may include system memory 1102 in the form of read only memory (ROM) 1104 and random access memory (RAM) 1105. A basic input/output system (BIOS) 1106 may be stored in ROM 1104. System software 1107 may be stored in RAM 1105 including operating system software 1108. Software applications 1110 may also be stored in RAM 1105.

The system 1100 may also include a primary storage means 1111 such as a magnetic hard disk drive and secondary storage means 1112 such as a magnetic disc drive and an optical disc drive. The drives and their associated computer-readable media provide non-volatile storage of computer-executable instructions, data structures, program modules and other data for the system 1100. Software applications may be stored on the primary and secondary storage means 1111, 1112 as well as the system memory 1102.

The computing system 1100 may operate in a networked environment using logical connections to one or more remote computers via a network adapter 1116.

Input/output devices 1113 may be coupled to the system either directly or through intervening I/O controllers. A user may enter commands and information into the system 1100 through input devices such as a keyboard, pointing device, or other input devices (for example, microphone, joy stick, game pad, satellite dish, scanner, or the like). Output devices may include speakers, printers, etc. A display device 1114 is also connected to system bus 1103 via an interface, such as video adapter 1115.

In order to achieve optimum performance, the preferred embodiment of the present invention uses interleaved commands to two or more planes of the flash memory to improve performance. Were this to be done without mapping defective blocks as they are discovered during the back-up operation, it would not be possible to adjust the application of interleaved commands to achieve this advantage. Instead, when a system according to the state of the art encountered new defective blocks, it would have to take the performance-impeding step of erasing new blocks to compensate for the presence of those newly discovered defective blocks, thus losing the benefit of any performance advantage provided by the use of interleaved commands.

The proposed combination of techniques has the advantage over other known solutions in that it can dynamically adjust to the presence of Grown bad blocks as they are discovered and only apply interleaved commands to plane pairs which are not part of defective blocks once the locations of those Grown bad blocks are known. This maintains the performance advantage that interleaved commands afford.

Furthermore, the method described here not only improves the performance of back-up operations (writing to Flash) but also of operations to restore data from Flash to system memory.

Figure 12:
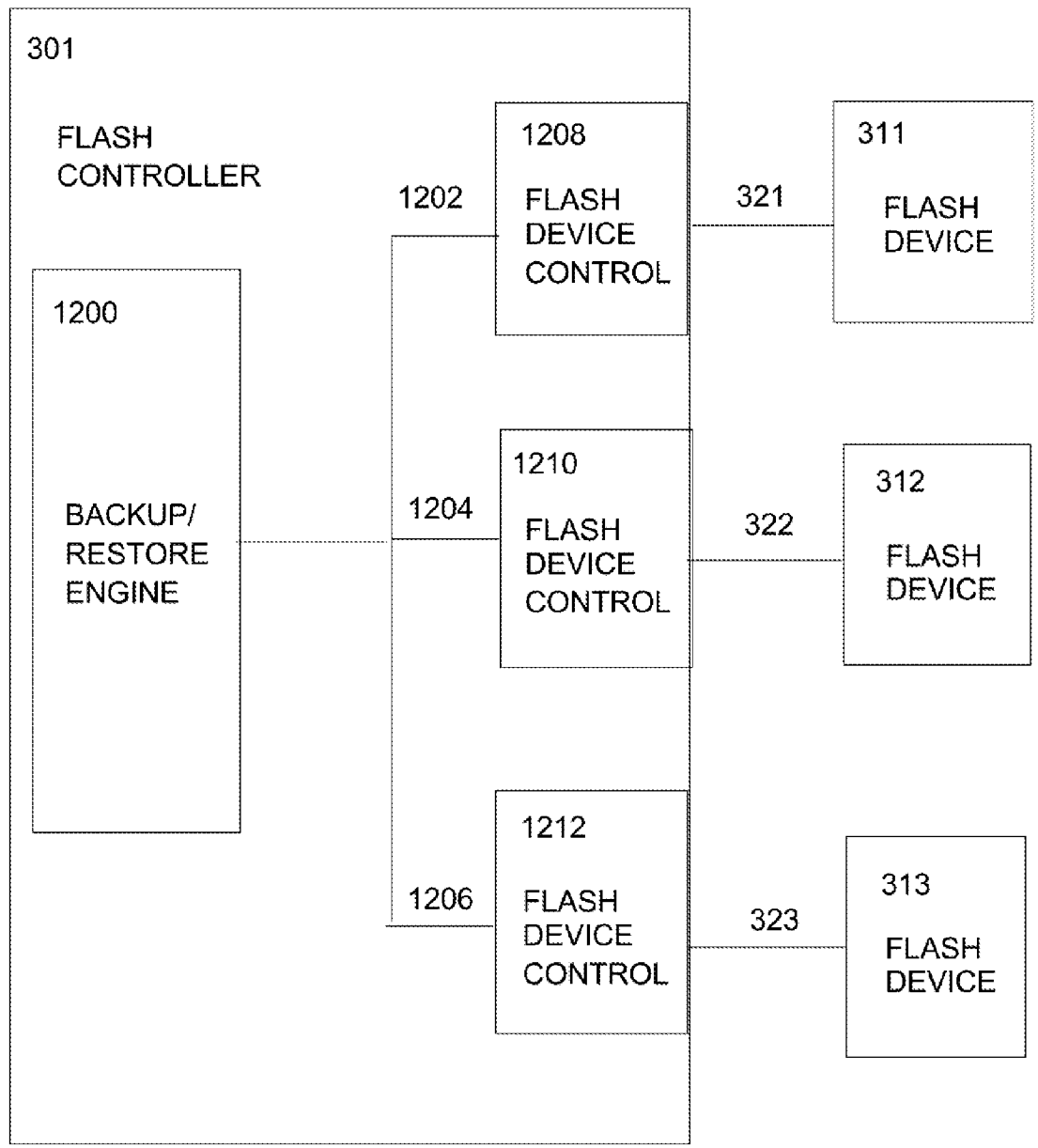
FIG. 12 is a block diagram showing greater detail of an example embodiment of a flash memory system in accordance with a preferred embodiment of the present invention.

In more detail, then, flash devices according to the state of the art are divided into dies and each die has two planes. It will be clear to one of ordinary skill in the art that future devices may comprise more than two planes, but for the purposes of the present description, only two planes will be discussed. Each plane consists of a certain number of blocks (usually multiples of 1 K) and each block has a certain number of pages (usually multiples of 128). Each page can hold a given payload of data (typical sizes are multiples of 4 K). It is also possible to control multiple Flash devices simultaneously through separate interfaces as shown in FIG. 12. In the present discussion, each distinct flash device is known as a channel.

FIG. 12 shows in more detail the example embodiment of a flash memory system in accordance with a preferred embodiment of the present invention of FIG. 3. Elements already described with reference to FIG. 3 remain as so described. Additional details are shown in the Flash Controller 301, in which are located Backup/Restore Engine 1200 and Flash Device Control components 1208, 1210, 1212. Commands, such as the interleaved commands of the present embodiment, are communicated from Backup/Restore Engine 1200 to Flash Device Control components 1208, 1210, 1212 by means of command buses 1208, 1210, 1212 respectively.

FIG. 12 thus shows how the Flash controller is subdivided into discrete Flash Device Control components and a Back-up/Restore Engine. Each Flash Device control component controls the Flash device on a particular channel. The Back-up/Restore Engine 1200 issues discrete commands to each Flash Device Control component instructing them to back-up a portion of the system data to a Flash page. The discrete commands are issued on a Command Bus 1208, 1210, 1212 between the Back-up/Restore Engine 1200 and each Flash Device Control component 1208, 1210, 1212 as shown in FIG. 12.

As a dump operation proceeds within a particular LBA, the system of the preferred embodiment keeps two bitmaps: a Known Bad Planes Map and a Grown Bad Planes Map. The Known Bad Planes Map indicates the planes belonging to blocks known to be bad prior to the initiation of the dump operation. The Grown Bad Planes Map indicates the planes belonging to blocks previously unknown to be bad, prior to the initiation of the dump operation, and discovered to be bad as the dump operation proceeded. Each plane in all available Flash devices is represented by one bit in each of these bitmaps. A 1b indicates the plane belongs to a bad block (either known or grown) whilst 0b indicates the plane belongs to a usable block. The embodiment of the present invention described here uses these bitmaps to determine which Flash program commands can be done as an interleaved pair and which cannot.

When about to write a stripe of data to Flash the first step is to OR the current versions of the Known Bad Planes Map and the Grown Bad Planes Map together to form a Combined Bad Planes Map, C.

Let $C(n)$ be a bit in that combined map where $0<=n<64$. Furthermore, in the example of FIG. 2 with 64 planes, the bit $C(n)$ represents the plane that is located on Channel (n mod 8), Die (n/16), Plane ((n/8) mod 2) (where/is integer division).

In order to write a stripe, the Back-up/Restore Engine 1200 will send up to 64 commands (potentially one for each plane) out to the Flash Device Control components 1208, 1210, 1212 (up to 8 commands for each controller per stripe). If a pair of planes in the same die are both good, i.e., are not part of a Known or Grown bad block then the commands for those planes can be done as an interleaved pair thus improving the write performance. To indicate that a plane command is to be done as an interleaved pair the Back-up/Restore Engine 1200 can set a single bit signal, called "Pair" to 1b to the relevant Flash Device Control component 1208, 1210, 1212 when it sends the command on the Command bus 1202, 1204, 1206. If only one plane in a particular die is good then when the Back-up/Restore Engine 1200 sends the command for that plane it sets Pair to 0b. It would not send a command for the other plane in the die since it belongs to a bad block.

When the Flash Device Control component 1208, 1210, 1212 sees that for a particular command, the "Pair" bit is set then it will wait for the Back-up/Restore Engine 1200 to send the command for the other plane in the same die and then perform an interleaved program command to both planes on that die. If however it sees Pair=0b for a command it can issue a single program command for that plane straightaway.

Figure 13:
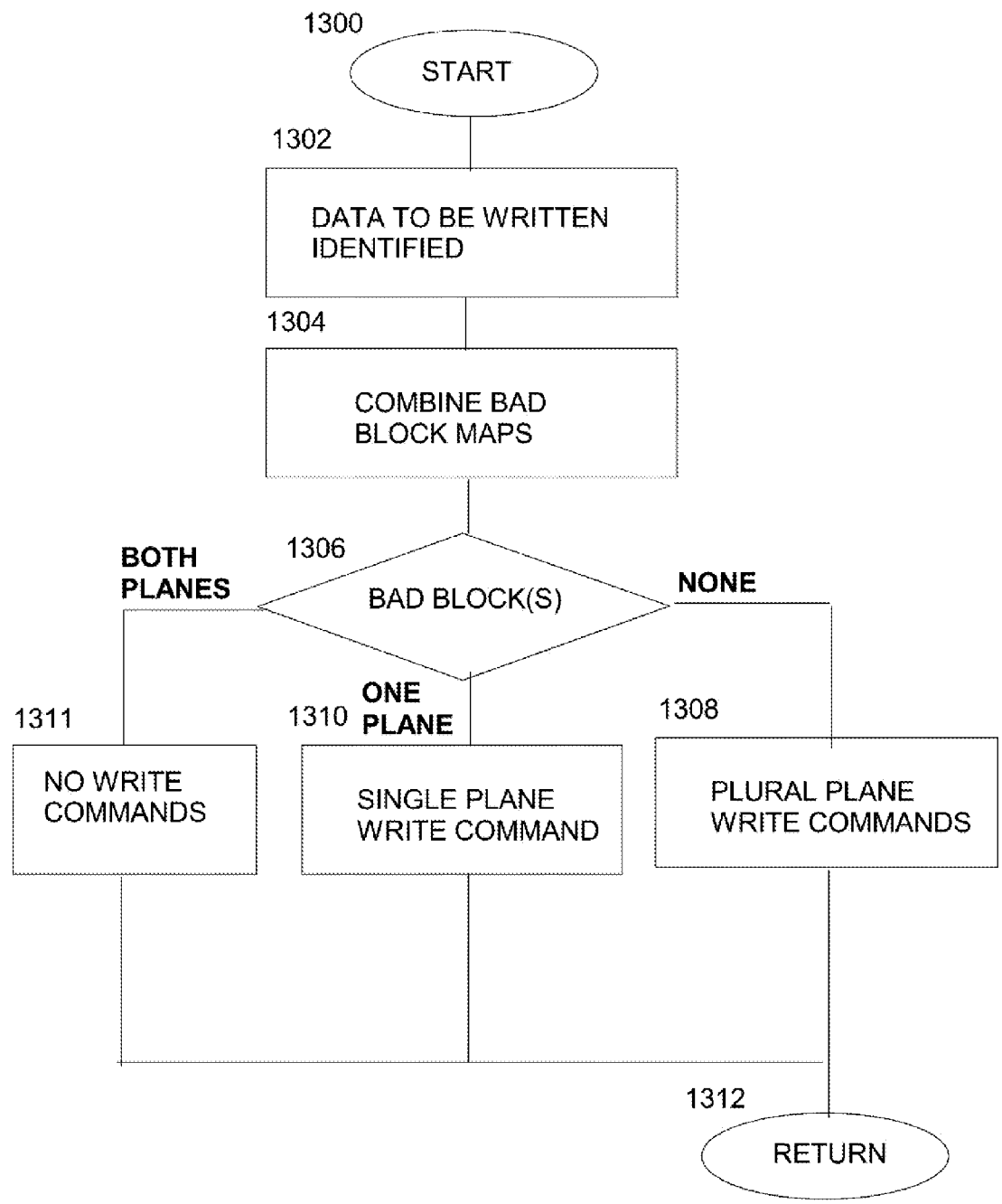
FIG. 13 is a flow diagram showing an example embodiment of a method of operation of a flash memory system in accordance with a preferred embodiment of the present invention.

The above method is shown in simplified form in FIG. 13. After START step 1300, the data to be written is identified at step 1302. The bad block maps (known and grown) are combined at step 1304. At test step 1306, the existence of bad blocks in the relevant areas of flash memory is determined. Responsive to finding no bad block at test step 1306, a plurality (at least a pair) of write commands is issued at step 1308 to separate planes of the flash memory simultaneously and the process completes at RETURN step 1312. This is the "Pair" response described above. Responsive to finding a bad block in one plane at test step 1306, a single command is issued to write to that one plane of the flash memory at step 1310 and the process completes at RETURN step 1312. Responsive to finding bad blocks in both planes at test step 1306, a single command is issued to write to that one plane of the flash memory at step 1311 and the process completes at RETURN step 1312.

The algorithm for determining the value of the signal "Pair" when sending commands is then as encapsulated by the following pseudocode:

```
Loop 1: For n = 0 to 63 loop
    Loop 2: For i = 0 to 63 loop
        if [(i mod 8) = (n mod 8)] and [(i/16)=(n/16)] and [i n] then
            m:=i;
            exit loop 2;
        end if
    End Loop 2
    If not (C(n) or C(m)) then
        Pair := 1b for command to plane n else Pair :=
        0b for command to plane n;
    end if
End Loop 1
```

Loop 2 finds the bit position, m, in map C which represents the other plane which resides in the same die on the same channel as the plane indicated by bit position n in map C.

Having determined bit positions m and n the statement after the end of Loop 2 determines whether either plane belongs to a bad block. If not, then the Pair signal can be set to 1b, otherwise it is 0b.

In this way the Combined Map C can be used to determine which commands for writing a stripe can be done as interleaved program commands and which can only be individual program commands.

When restoring backed-up data from Flash to system memory, the Back-up/Restore Engine 1200 will also keep a Known Bad Planes Map and a Grown Bad Planes Map as it reads data stripes along an LBA. Again these two maps can be OR'd together to form a combined map C. When the Back-up/Restore Engine 1200 issues commands to the Flash Device control components 1208, 1210, 1212 to read pages from a stripe, it can use combined map C and the above pseudocode to determine whether or not to assert the Pair signal.

When the Flash Device Control component 1208, 1210, 1206 sees that for a particular read command, the "Pair" bit is set then it will wait until the Back-up/Restore Engine 1200 sends the command for the other plane in the same die and then perform an interleaved read command on both planes of that die. If however it sees Pair=0b for a read command it can issue a single read command for that plane straightaway. Being able to perform an interleaved read command improves the performance when restoring data from Flash.

Further advantages of the described back-up and restoration method are listed below:
  The described method can be implemented purely in hardware whilst most solutions can only be implemented in software. This means that the described solution does not require a processor to function. A processor would require significant power. In a data back-up application, which is activated when main power fails and only has limited stand-by power available, a processor free solution is an advantage.
  This described solution becomes more useful due to flash technology trends which indicate that as flash devices get smaller and more dense, the likelihood of encountering block errors increases. Thus a solution such as this, that handles bad blocks becomes more vital.
  The described solution is device independent. Different vendors produce different configurations and versions of flash systems. The described method can be implemented to work with any of these devices.

It is known that, in particular, NAND flash memory degrades during the writing process, and this phenomenon is more prevalent as device geometries shrink. This invention provides a solution to overcoming the presence of bad memory blocks, without requiring firmware intervention during the write or read process. This design allows for very high performance when dumping and restoring data to/from flash devices, without firmware intervention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

What is claimed is:

1. A method for back-up of data to flash memory, comprising:
    writing data to back up into stripes excluding pages on blocks of the flash memory known to be bad, wherein a stripe is a set of pages across all available flash memory backup devices, each device including at least multiple blocks that include multiple pages, the set of pages in a stripe having a same block and page address;
    embedding first metadata in each stripe indicating any blocks of the flash memory known to be bad;
    in response to encountering a new error in a block of flash memory during writing data to back up to a first stripe:
        re-writing the first stripe starting at a next available stripe excluding pages on the block of flash memory having the new error;
        writing subsequent stripes excluding pages on the block of flash memory having the new error; and
        embedding second metadata in the re-written first stripe and the subsequent stripes indicating a location of the block having the new error; and
    responsive to finding no bad blocks indicated in the first metadata, initiating a write to two or more stripes simultaneously.

2. The method of claim 1, wherein embedding first and/or second metadata in a stripe comprises:
    embedding the first metadata in each page of the first stripe, the first metadata including an identification number of the stripe of data, a stripe length field of an amount of data saved in the stripe, and an indication of known and/or new error blocks, respectively.

3. The method of claim 2, wherein in response to encountering a new error in a block of flash memory during writing data to back-up to a first stripe further comprises:
    updating the second embedded metadata in the re-written first stripe and each subsequent stripe to include an updated stripe size to indicate a capacity taking into account a known bad block, and the location of the block with the new error.

4. The method of claim 2, further comprising:
restoring backed-up data written into stripes to target memory, including:
reading the first and second metadata in the first stripe to determine pages of the first stripe that are bad;
writing all pages from the first stripe to target memory, excluding pages of the first stripe determined to be bad;
determining which stripe identification number is expected next, based on the first and second metadata;
in response to determining that the stripe identification number of a next stripe is not the expected stripe identification number and the stripe identification number of the next stripe is the stripe identification number of a stripe that has been restored to target memory:
reading the first and second metadata of the next stripe to determine pages of the stripe that are bad, including at least a new bad page;
writing all pages from the next stripe to target memory beginning at the location in target memory at which data from the previous stripe having a same stripe identification number was written, excluding pages of the stripe determined to be bad; and
adjusting the expected next stripe number.

5. The method of claim 4, wherein restoring backed up data further comprises:
responsive to determining that there are no bad pages in the first stripe, initiating a read from two or more stripes.

6. The method of claim 1, further comprising:
reading first and second metadata from pages of a stripe;
determining locations of error blocks; and
writing the back-up data to pages corresponding to a stripe, excluding pages on blocks determined to include errors.

7. The method of claim 1, wherein re-writing a stripe further comprises re-writing two or more stripes simultaneously.

8. A controller system for back-up of data to flash memory, comprising:
one or more processors, one or more computer-readable memories including one or more flash memories wherein each flash memory includes at least multiple blocks that include multiple pages, one or more computer-readable tangible storage devices, and program logic stored on at least one of the one or more storage devices for execution by at least one of the one or more processors via at least one of the one or more memories, the program logic comprising:
program instructions to write data to back up into stripes excluding pages on blocks of the flash memory known to be bad, wherein a stripe is a set of pages across all available flash memory backup devices, the set of pages in a stripe having a same block and page address;
program instructions to embed first metadata in each stripe indicating any blocks of the flash memory known to be bad;
program instructions, in response to encountering a new error in a block of flash memory during writing data to back up to a first stripe, to:
re-write the first stripe starting at a next available stripe excluding pages on the block of flash memory having the new error;
write subsequent stripes excluding pages on the block of flash memory having the new error; and
embed second metadata in the re-written first stripe and the subsequent stripes indicating a location of the block having the new error; and
program instructions, responsive to finding no bad blocks indicated in the first metadata, to initiate a write to two or more stripes simultaneously.

9. The controller system of claim 8, wherein the program instructions to embed first and/or second metadata in a stripe comprises:
program instructions to embed the first metadata in each page of the first stripe, the first metadata including an identification number of the stripe of data, a stripe length field of an amount of data saved in the stripe, and an indication of known and/or new error blocks, respectively.

10. The controller system of claim 9, wherein the program instructions in response to encountering a new error in a block of flash memory during writing data to back-up to a first stripe further comprises:
program instructions to update the second embedded metadata in the re-written first stripe and each subsequent stripe to include an updated stripe size to indicate a capacity taking into account a known bad block, and the location of the block with the new error.

11. The controller system of claim 9, further comprising:
program instructions to restore backed-up data written into stripes to target memory, including program instructions to:
read the first and second metadata in the first stripe to determine pages of the stripe that are bad;
write all pages from the first stripe to target memory, excluding pages of the first stripe determined to be bad;
determine which stripe identification number is expected next, based on the first and second metadata;
in response to determining that the stripe identification number of a next stripe is not the expected stripe identification number and the stripe identification number of the next stripe is the stripe identification number of a stripe that has been restored to target memory:
read the first and second metadata of the next stripe to determine pages of the stripe that are bad, including at least a new bad page;
write all pages from the next stripe to target memory beginning at the location in target memory at which data from the previous stripe having a same stripe identification number was written, excluding pages of the stripe determined to be bad; and
adjust the expected next stripe number.

12. The controller system of claim 11, wherein the program instructions to restore backed up data further comprise:
program instructions, responsive to determining that there are no bad pages in the first stripe, to initiate a read from two or more stripes.

13. The controller system of claim 8, further comprising:
program instructions to read first and second metadata from pages of a stripe;
program instructions to determine locations of error blocks; and
program instructions to write the back-up data to pages corresponding to a stripe, excluding pages on blocks determined to include errors.

14. The controller system of claim 8, wherein the program instructions to re-write a stripe further comprises program instructions to re-write two or more stripes simultaneously.

15. A computer program product for back-up of data to flash memory, the computer program product comprising:
one or more computer-readable storage devices and program instructions stored on at least one of the one or more storage devices, the program instructions comprising:
program instructions to write data to back up into stripes excluding pages on blocks of the flash memory known to be bad, wherein a stripe is a set of pages across all available flash memory backup devices, each device including at least multiple blocks that include multiple pages, the set of pages in a stripe having a same block and page address;
program instructions to embed first metadata in each stripe indicating any blocks of the flash memory known to be bad;
program instructions, in response to encountering a new error in a block of flash memory during writing data to back up to a first stripe, to:
re-write the first stripe starting at a next available stripe excluding pages on the block of flash memory having the new error;
write subsequent stripes excluding pages on the block of flash memory having the new error; and
embed second metadata in the re-written first stripe and the subsequent stripes indicating a location of the block having the new error; and
program instructions, responsive to finding no bad blocks indicated in the first metadata, to initiate a write to two or more stripes simultaneously.

16. The computer program product of claim 15, wherein the program instructions to embed first and/or second metadata in a stripe comprises:
program instructions to embed the first metadata in each page of the first stripe, the first metadata including an identification number of the stripe of data, a stripe length field of an amount of data saved in the stripe, and an indication of known and/or new error blocks, respectively.

17. The computer program product of claim 16, wherein the program instructions in response to encountering a new error in a block of flash memory during writing data to back-up to a stripe further comprise:

program instructions to update the second embedded metadata in the re-written stripe and each subsequent stripe to include an updated stripe size to indicate a capacity taking into account a known bad block, and the location of the block with the new error.

18. The computer program product of claim 16, further comprising:
program instructions to restore backed-up data written into stripes to target memory, including program instructions to:
read the first and second metadata in the first stripe to determine pages of the stripe that are bad;
write all pages from the first stripe to target memory, excluding pages of the first stripe determined to be bad;
determine which stripe identification number is expected next, based on the first and second metadata;
in response to determining that the stripe identification number of a next stripe is not the expected stripe identification number and the stripe identification number of the next stripe is the stripe identification number of a stripe that has been restored to target memory:
read the first and second metadata of the next stripe to determine pages of the stripe that are bad, including at least a new bad page;
write all pages from the next stripe to target memory beginning at the location in target memory at which data from the previous stripe having a same stripe identification number was written, excluding pages of the stripe determined to be bad; and
adjust the expected next stripe number.

19. The computer program product of claim 15 further comprising:
program instructions to read first and second metadata from pages of a stripe;
program instructions to determine locations of error blocks; and
program instructions to write the back-up data to pages corresponding to a stripe, excluding pages on blocks determined to include errors.

20. The computer program product of claim 15, wherein the program instructions to re-write a stripe further comprise program instructions to re-write two or more stripes simultaneously.

* * * * *